United States Patent
Maurer

[11] 3,859,269
[45] Jan. 7, 1975

[54] OXIDATIVE DEGRADATION OF POLYVINYL ALCOHOL

[75] Inventor: Hans W. Maurer, Paducah, Ky.

[73] Assignee: Westvaco Corporation, New York, N.Y.

[22] Filed: Sept. 28, 1973

[21] Appl. No.: 401,876

[52] U.S. Cl.................. 260/91.3 VA, 260/29.6 WA
[51] Int. Cl. ............................................. C08f 3/34
[58] Field of Search ............................ 260/91.3 VA

[56] References Cited
FOREIGN PATENTS OR APPLICATIONS
398,383   5/1964   Japan OTHER PUBLICATIONS
Polyvinyl Alcohol, Pritchard, (1970), pp. 85,86, Gordon and Breach Science Publishers.

Primary Examiner—Paul Lieberman

[57] ABSTRACT

Polyvinyl alcohol (PVA) solutions are reduced in viscosity in a predictable manner by reacting solutions of commercially available PVA with small amounts of hydrogen peroxide at high temperature in the presence of a metallic ion catalyst. The viscosity reductions may be carried out using either a batch process or with a continuous cooking process, to produce film forming solutions of PVA having practical application in the paper industry as either a high speed surface or a coating binder.

3 Claims, 2 Drawing Figures

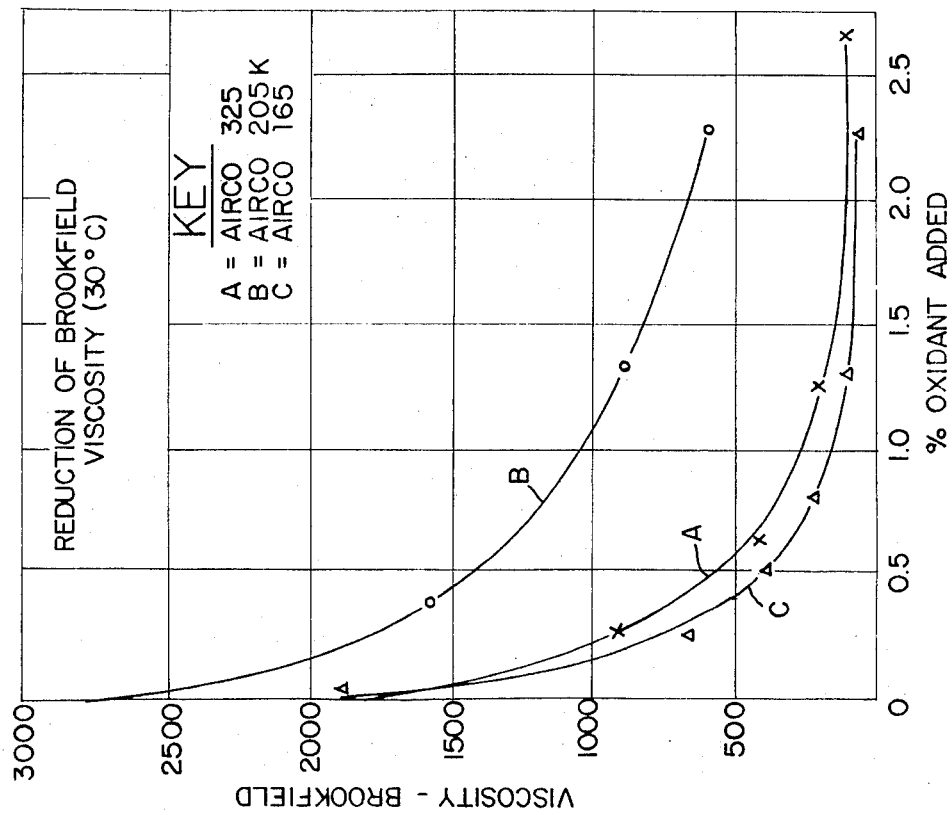
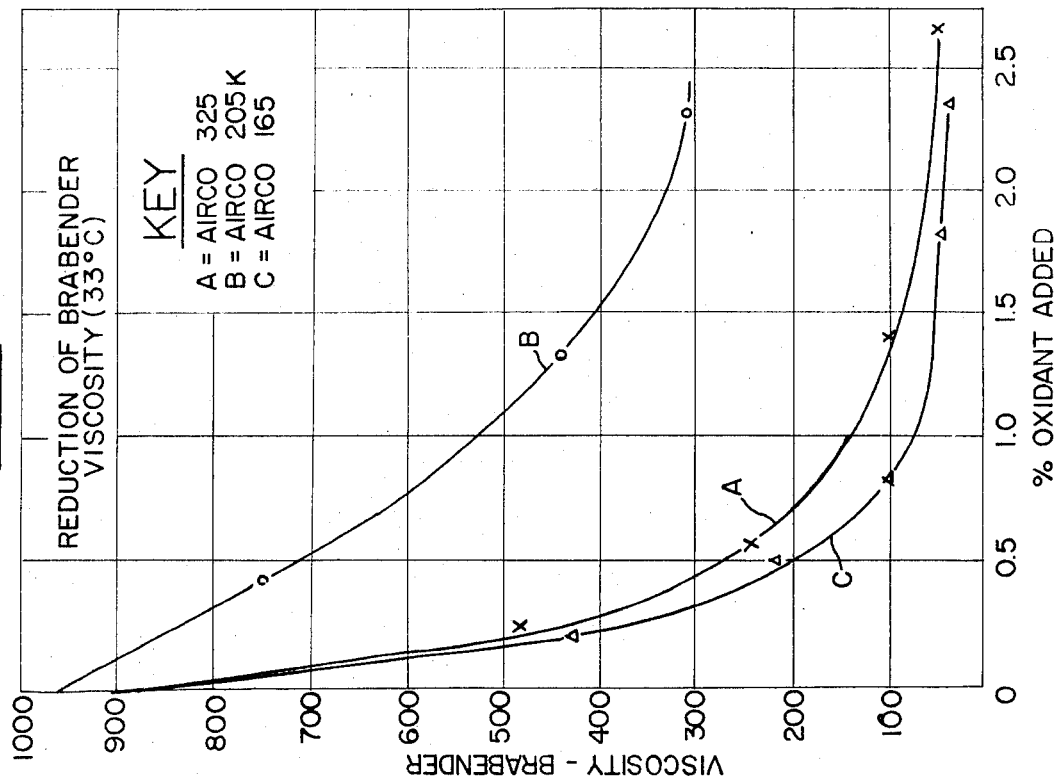

OXIDATIVE DEGRADATION OF POLYVINYL ALCOHOL

SUMMARY OF INVENTION

The present invention relates generally to a treatment for reducing the viscosity of polyvinyl alcohol (PVA) solution in a predictable manner and particularly to a process for degrading commercially available PVA in an oxidative reaction to produce a PVA solution useful as a surface size or binder for a pigmented coating to be applied to the surface of paper.

PVA is used in the paper industry principally as either a surface sizing agent or as a binder in pigmented coatings. When used as a surface sizing agent, PVA yields grease resistance, smoothness, ink holdout, pick resistance and generally improved surface strength characteristics to the paper. When used as a binder in pigmented coatings, PVA is more effecient than starch, casien or other commonly known binders and thus permits the application of a coating having a higher pigment to binder ratio of the paper.

However, it was found in a series of high speed surface sizing trials with PVA that coat weights above 2 lb./side per ream could not be successfully applied to paper, and the reason for this lack of success was attributed to the rheology of the commercially available PVA grades used. Thus it was theorized that at high speeds and using in particular a gate roll size press, increased pickup by the sheet might be attained by using a PVA solution of reduced viscosity. In addition it was also found during the trials that the commercially available PVA grades were being rejected in both the metering nip and the transfer nip of the gate roll size press at high speeds. The reason for this phenomena was suggested to be a "balling up" of the PVA chains into coils which would not enter the nip. Accordingly, it was theorized that a PVA grade of lower molecular weight might reduce the curling tendency of the PVA chains and thus improve runnability.

Hence the present invention was developed for the purpose of degrading and thereby reducing the viscosity and molecular weight of some existing commercially available grades of PVA. It was known that PVA solutions could be degraded by heating with hydrogen peroxide to reduce the viscosity of the solutions. However, it was also a requirement of the present invention that the PVA degradation should not be too severe or its film forming ability and the strength of its application to the paper surface might turn out to be unsatisfactory. Thus even though it was known that PVA solutions could be degraded by heating in the presence of hydrogen peroxide, there was no reference to a predictable and useful application of the reaction. Accordingly, the present invention was developed to provide a predictable process for the oxidative degradation of PVA solutions to reduce their viscosity through the mechanism of molecular degradation and thereby produce a product having particular utility in the paper industry as either a surface size treatment or a binder for paper coatings.

DETAILED DESCRIPTION

The present invention relates generally to the oxidative degradation of PVA to produce a PVA solution particularly useful in the paper industry. The invention was developed with the following goals in mind:

1. A predictable reduction of the viscosity of an aqueous solution of commercially available grade of PVA to improve its rheology and permit its use on high speed equipment for application to paper.
2. The preservation of the applicability of PVA as a binder for paper fibers and a coating pigment which could otherwise be destroyed by the excessive oxidation and degradation of commercially available grades of PVA.
3. The generation of aldehydic groups on PVA to crosslink with hydroxyl groups during drying of a film of oxidized PVA on paper for the purpose of improving the strength of the surface film.

Thus it was found that a satisfactory and predictable oxidation reaction, using commercially available grades of PVA, could be achieved for paper making application by reacting an aqueous solution of PVA with small amounts of hydrogen peroxide in the presence of a transition metallic ion catalyst at temperatures in excess of 90°C. The successful application of the above noted procedure within the defined limits was found to be dependent on the presence within the PVA material of weak links (head-head, tail-tail) structures, a portion of which would be broken during the oxidation/degradation reaction. In addition, it was discovered that the degradation of all of the weak links commonly present in commercially available PVA grades would produce an unwanted loss of the desirable rheological, adhesive and cohesive properties of the final product. Accordingly, the success of the present invention was predicated on the development of a process for oxidatively degrading a PVA sample having a known number of abnormal fractions in such a manner that some, but not all, of the fractions would be broken in the reaction.

It will be recalled that the polymerization of the PVA precursor polyvinyl acetate (PVAc), occurs by a chain reaction mechanism, the majority of the steps in the growth of the PVAc chains are such that the head of one monomer is joined to the tail of another, thus head-to-tail arrangement. However, a few additions occur to give head-to-head and tail-to-tail arrangements. The fraction of these abnormal additions depends on the temperature of the polymerization reaction and varies with the known PVA grades from 1.23 percent at 25°C. to 1.95 percent at 110°C. When the acetates are hydrolyzed, the head-to-head, tail-to-tail structures become 1,2-glycols which have hydroxyl substituents on adjacent carbons of the chain instead of the alternate carbons as usual. Of course, it was known that hydrogen peroxide alone would cleave the 1,2-glycols, however it was suspected that oxidation of PVA with hydrogen peroxide would also raise the possibility of forming many different organic radicals which could combine with one another or which could produce other radicals by a propogation procedure. Furthermore, it was known that the oxidation of PVA by hydrogen peroxide proceeded by a free radical mechanism and that the initial free radicals came from a decomposition of the hydrogen peroxide. However, experiments illustrated that oxidative degradation of PVA with hydrogen peroxide alone did not produce the desired reductions in viscosity nor could the viscosity reductions be predicted. In addition, when hydrogen peroxide was used alone to degrade PVA samples, traces of excess peroxide could be found in the PVA solution even after the reaction was apparently completed. Accordingly, in an effort to achieve the desired reduction in viscosity of PVA in a predictable manner while at the same time, carrying out the reaction in such a way that few if any undersired by-products would be produced, the combined treatment of the present invention was developed.

Thus, in accordance with the present invention, the desired reduction in viscosity of a hydrolyzed PVA solution was achieved by reacting the PVA solution with hydrogen peroxide in the presence of a metallic ion catalyst. For the purposes of the present invention, it was suspected that the addition of a transition metallic ion catalyst to the PVA solution, such as $Cu^{++}$, $Cu^+$, $Fe^{++}$ or $Fe^{+++}$, would aid the heat applied to the reaction products to decompose the hydrogen peroxide and produce the free radicals necessary for a predictable molecular degradation of the PVA. To prove the theory, copper ions ($Cu^{++}$) were used to produce the desired increase in viscosity reduction as compared with a simple hydrogen peroxide reaction, and achieve a predictable process.

EXAMPLE I

The oxidation degradation of a super-hydrolyzed, high viscosity grade of PVA (Airco 165, supplied by Airco Chemical Company) was performed first with hydrogen peroxide and secondly with hydrogen peroxide in the presence of a copper ion catalyst to demonstrate the need for a transition metallic ion catalyst in the system to aid the breakdown of the peroxide. For these experiments, the reactions were carried out in a batch process using a Brabender Amylograph-Viscograph. The concentration of the PVA solution was selected to obtain a viscosity reading for the undegraded sample of around 900 Brabender units (about 8 ¼% PVA to water by weight). The experiments were then carried out as follows: 38 minutes of heating at 1.5°C. per minute from 33°–90°C.; addition of oxidant; 15 minutes heating at 90°C.; 38 minutes to cool at 1.5°C. per minute to 33°C.; and, finally, 20 minutes at 33°C. Each of the oxidants were added to the PVA solution as follows. 0.50 percent hydrogen peroxide (based on the weight of the PVA in solution) was added to the mixture in the form of 2 percent aqueous solution. For the hydrogen peroxide/copper catalyst sample, first, 0.05% $CuSO_4 \cdot 5H_2O$ (based on the weight of PVA in solution) was dissolved in 10 ml. of water and added to the solution. This was followed by about 1 minute of mild agitation and finally, the same amount of hydrogen peroxide used on the first sample was added. After the reactions, the degraded PVA samples collected, the reductions in viscosity were measured and the results recorded as set forth in Table I.

TABLE I

Airco 165 — Oxidation Degradation Reactions

| Oxidant | Brabender Units, 33°C. | Brookfield Visc. 30°C. (cps) |
|---|---|---|
| None | 920 | 1845 |
| 0.50% $H_2O_2$ | 470 | 836 |
| 0.50% $H_2O_2$ 0.05% $CuSO_4 \cdot 5H_2O$ | 210 | 422 |

A comparison between the first undegraded sample and the two oxidative reactions shows the utility of the metallic catalyst in the system to decompose the hydrogen peroxide and thereby produce the desired reduction in viscosity. For these experiments, a check for excess peroxide was positive in the straight hydrogen peroxide reaction but negative for the reaction containing the copper ions.

Another set of experiments were performed using three different commercially available PVA samples and with varying amounts of the hydrogen peroxide/copper oxidant disclosed herein to show the effectiveness of the invention on different PVA grades and to illustrate the ranges of viscosity reduction obtainable. In each case, the same batch process employed in the first examples was used with a substantially 10 to 1 ratio of hydrogen peroxide to $CuSO_4 \cdot 5H_2O$ being maintained. The results of the experiment are set forth below in Table II.

Table II

Batch Oxidation Reactions

| PVA Grade (Airco) | Oxidant $H_2O_2$/ $CuSO_4 \cdot 5H_2O$ | Brabender Units 33°C. | Brookfield Viscosity (cps) | % Solids |
|---|---|---|---|---|
| 325 | None | 900 | 1708 | 10.4 |
| 325 | 0.26%–0.03% | 480 | 912 | 10.4 |
| 325 | 0.59%–0.06% | 235 | 434 | 10.4 |
| 325 | 1.32%–0.13% | 100 | 209 | 10.4 |
| 325 | 2.60%–0.26% | 45 | 113 | 10.4 |
| 165 | None | 920 | 1845 | 8.25 |
| 165 | 0.20%–0.02% | 430 | 804 | 8.25 |
| 165 | 0.50%–0.05% | 210 | 422 | 8.25 |
| 165 | 1.30%–0.13% | 55 | 122 | 8.25 |
| 165 | 2.30%–0.23% | 35 | 73 | 8.25 |
| 205K | None | 960 | 2580 | 24.0 |
| 205K | 0.40%–0.04% | 755 | 1543 | 24.0 |
| 205K | 1.30%–0.13% | 450 | 900 | 24.0 |
| 205K | 2.30%–0.23% | 310 | 584 | 24.0 |

It may be seen from studying the results in Table II, and the curves in FIGS. 1 and 2 reproduced from the data taken, that the increments of viscosity reduction obtained by adding additional hydrogen peroxide and catalyst decreased as the amount of oxidant increased. Furthermore, since the samples chosen for the test, were each considered fully or super hydrolyzed, it would appear for these particular grades that an oxidant level or about 1.3 percent hydrogen peroxide with 0.13 % $CuSO_4 \cdot 5H_2O$ appears to be the maximum amount of oxidant for the effective viscosity reduction required.

Later on, in an effort to establish a correlation between the actual viscosity measurements shown in Table II and the expected viscosity reduction, calculations were made to determine the predicted viscosity reduction using an oxidant level of 1.3 percent hydrogen peroxide with 0.13 % $CuSO_4 \cdot H_2O$. For the purposes of the calculations certain assumptions were made. First the PVA samples were assumed to be monodisperse and the chain scission was assumed to occur at random sites throughout the chains. In addition, it was assumed that the cleaveage of 1,2-glycols was a predominant reaction in the oxidation of PVA. Thus, assuming that about 1.7 percent of the bonds in PVA are involved in 1,2-glycol structures and since these were thought to be the principal point of chain scissions, a degree of polymerization of 0.017 was assumed for the calculations. Furthermore, since the PVA samples were all used at identical concentrations and temperatures, it was assumed that a comparison would be possible relating viscosities to molecular weights.

Accordingly, based on the above assumptions and knowing that 1.3 percent hydrogen peroxide corresponded closely to the theoretical mole requirement for oxidant cleavage of the estimated average 1.7% 1,2-glycol bonds in the samples used, the Mark-Houwink-Sakurada law ($[\eta]=KM^a$), relating intrinsic viscosity and molecular weight, was used to calculate the predicted final viscosities. For the purpose of the calculations, the value for $a$ was selected as $a = 0.6$ since for PVA at 25°–30°C., the value of $a$ ranges from 0.50–0.76. The viscosity of the undegraded sample was substituted for K, and for M, the ratio of the calculated weight average degree of polymerization to the initial degree of polymerization of each sample was used. The data obtained is shown in Table III.

TABLE III

Comparison of Actual and Predicted Viscosities
(1.3% $H_2O_2$ —0.13% $CuSO_4.5H_2O$)

| PVA Grade (Airco) | Initial Viscosity (cps) | Actual Viscosity (cps) | Predicted Viscosity (cps) |
|---|---|---|---|
| 325 | 1708 | 209 | 85 |
| 165 | 1845 | 122 | 306 |
| 205K | 2580 | 900 | 1000 |

The initial viscosities and the actual viscosities after reaction with the designated oxidant level were each measured using a Brookfield Viscometer at 30° C. and 20 rpm. The deviations between the actual viscosities obtained and the predicted viscosities calculated varied, but the variations were expected and were deemed to be reasonable considering the assumptions made. For instance, the extension of the Mark-Houwink-Sakurada law relating the viscosity and molecular weight was probably not entirely valid from a theoretical standpoint. In addition, it was known that there was a possibility of aldehydes being formed during the hydrogen peroxide oxidation of PVA, which could cause the chains to crosslink by forming hemiacetals to show an increase in the actual viscosities measured. Moreover, the initial assumptions of monodisperse samples and random scission could not be applied strictly, but were only made to simplify the calculations. Therefore, considering the above factors, the predicted and actual viscosities cam out fairly close and gave at least some support to indicate that cleavage of 1,2-glycols was the predominant reaction in the oxidation of PVA, while establishing a utility for theoretical statistical equations.

In addition to the batch oxidation experiments, a series of oxidative degradation experiments were carried out using a fully hydrolyzed PVA grade in a continuous starch cooking apparatus substantially as described in applicants U.S. Pat. No. 3,485,667 assigned to the present assignee herein. The experiments were performed by preparing a PVA water slurry having an initial solids content of about 12% PVA by weight to which varying amounts of the preferred copper catalyst were added. Meanwhile, the starch cooker was prepared for use by adjusting the cooking conditions to about 150°C. at 60 psig with water passing through. Before adding the PVA solution to the cooker, the hydrogen peroxide oxidant was added in amounts proportional to the amount of copper catalyst added (about a 10 to 1 ratio) and finally the slurry was passed through the starch cooker while maintaining the original operating conditions. When oxidatively degraded PVA began coming out of the starch cooker, it was collected for measurements of viscosity.

Viscosity measurements for the different samples were measured using a Brookfield viscometer at 20 rpm and at 30°C. The results of these experiments are reproduced in Table IV.

TABLE IV

Continuous Oxidative Reactions (Airco 325)

| Oxidant $H_2O_2/CuSO_4.5H_2O$ | Brabender Units 33°C | Brookfield Viscosity (cps) | % Solids |
|---|---|---|---|
| None | 1470 | 1200 | 9.88 |
| 0.26%–0.03% | 717 | 658 | 10.4 |
| 0.59%–0.06% | 670 | 620 | 10.2 |
| 1.32%–0.13% | 400 | 390 | 9.43 |
| 2.00%–0.20% | 150 | 145 | 10.5 |

A comparison of the data for the continuous oxidation process, with the data in Table II for the same sample (Airco 325) in the batch oxidation process, shows that viscosity reductions in the starch cooker were less than those obtained with the batch process. However, these differences were attributed to the short retention time of the PVA product in the continuous cooker apparatus. However, it is known that various retention devices may be incorporated in a continuous cooking apparatus, therefore the good viscosity reduction obtained with the batch oxidation process could obviously be matched in the continuous oxidation process by simply incorporating a suitable retention chamber into the continuous cooking apparatus. Accordingly, the data reproduced in Table IV shows that a continuous high temperature starch cooking apparatus can be used for the oxidative degradation of an aqueous PVA solution to desired viscosity levels as a function of the amount of oxidant used.

Of course, the purpose of the invention was directed primarily at obtaining a PVA product of reduced viscosity for improved runnability on a high speed gate roll size press, however it was also recognized that too much degradation of the PVA material might produce a product that was undersirable for its intended use. Therefore, additional experiments were conducted to determine if the PVA samples, degraded according to the present invention, would maintain the desirable properties exhibited by unoxidized PVA when used as a sizing agent for paperboard, and whether or not the oxidized PVA would perform as a binder in a coating formulation in substantially the same manner as the undegraded PVA.

Based on the above noted additional experiments, it was found that limited degradation of PVA did not adversely effect the film forming properties of PVA when applied to paper and paperboard surfaces. The trials indicated that oxidant levels of up to 0.60% $H_2O_2$ – 0.06% $CuSO_4. 5H_2O$ based on dry PVA could be safely used. Furthermore, the reduced viscosity of the PVA solution at the same oxidant level improved the runnability of the PVA at the size press.

Similar data taken from experiments using a degraded PVA in a coating formulation showed that degradation of the PVA with the same level of oxidant noted above did not produce a deleterious effect to the surface strength characteristics of the paper coated with the formulation.

Accordingly it may be seen that the present invention sets forth a novel process for predicting the reduction in viscosity of a PVA solution using either a batch or continuous process, wherein the reduction in viscosity is achieved through the oxidative degradation of the PVA solution with hydrogen peroxide in the presence of a transition metallic ion catalyst, such as copper ($Cu^{++}$). Thus it will be understood that even though only one preferred example has been disclosed in detail, the invention is intended to cover all changes and modifications that might be made by one skilled in the art and which do not depart from the spirit and scope of the invention as defined in the appended claims.

I claim:

1. The method of treating an aqueous polyvinyl alcohol solution to produce a predictable reduction in its viscosity which comprises oxidizing the polyvinyl alcohol solution at a temperature of from about 33° to 150°C. with hydrogen peroxide in the presence of a $Cu^{++}$ metallic ion catalyst in the ratio of about 10 to 1 with the addition of by weight from about 0.20 percent −1.30 percent hydrogen peroxide and by weight 0.02 percent−0.13 percent of the $Cu^{++}$ catalyst the weight of the hydrogen peroxide and the $Cu^{++}$ ion catalyst being based on the weight of poly vinyl alcohol in solution, and recovering the reduced in viscosity polyvinyl alcohol solution.

2. The method of claim 1 wherein the oxidation reaction is carried out in a batch process at a temperature of from 33–90°C. and for a period of about 2 hours.

3. The method of claim 1 wherein the oxidation reaction is carried out in a continuous cooking process at a temperature of about 150°C. and a pressure of about 60 psig.

* * * * *